United States Patent
Urbanic

[11] 3,910,481
[45] Oct. 7, 1975

[54] COLLAPSIBLE BACK-UP TOOL
[75] Inventor: John M. Urbanic, Pittsburgh, Pa.
[73] Assignee: Aluminum Company of America, Pittsburgh, Pa.
[22] Filed: Dec. 11, 1974
[21] Appl. No.: 531,528

[52] U.S. Cl. .................... 228/49; 228/50; 228/216
[51] Int. Cl.² ........................................ B23K 37/04
[58] Field of Search ............... 228/49, 50, 56, 57; 29/491, 272, 234

[56] References Cited
UNITED STATES PATENTS

| | | | |
|---|---|---|---|
| 3,640,115 | 2/1972 | Duncan | 29/234 X |
| 3,735,472 | 5/1973 | Silverman | 29/272 |
| 3,825,165 | 7/1974 | Howell | 228/50 |

Primary Examiner—Al Lawrence Smith
Assistant Examiner—Margaret M. Joyce

[57] ABSTRACT

A collapsible alignment and back-up tool adapted to be inserted in abutting ends of pipes or tubular members to be joined together, as by welding and the like, for maintaining such abutting ends in proper alignment and providing a continuous back-up during the joining operation includes an assemblage that is collapsible when subjected to the influence of a magnetic field. Due to its magnetic structural characteristics, the tool may be caused to move longitudinally within a tubular member or it may be restrained at any location along the length of the tubular member. A pair of end plugs are slidably mounted on a shaft. The ends of a plurality of interengaging arcuate segments are supported on shoulders carried by each of the end plugs to form, in expanded condition, a substantially cylindrical surface that collapses when the end plugs are moved outwardly apart along the shaft. The end plugs are formed of a magnetic material and all other elements are formed of relatively nonmagnetic material. When subjected to the influence of a magnetic field, the end plugs are caused to move apart to collapse the tool and/or to move the tool longitudinally within a pipe or tubular member.

7 Claims, 4 Drawing Figures

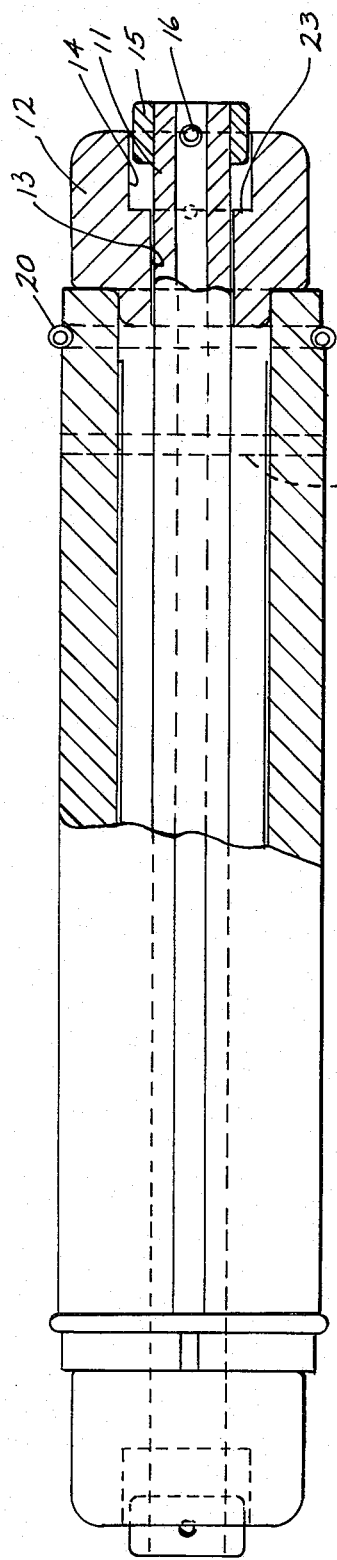
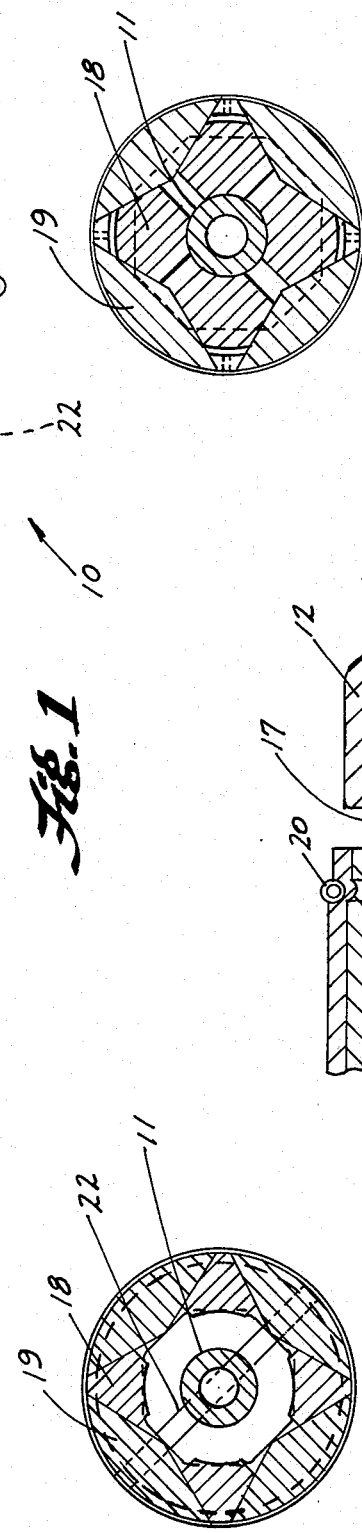
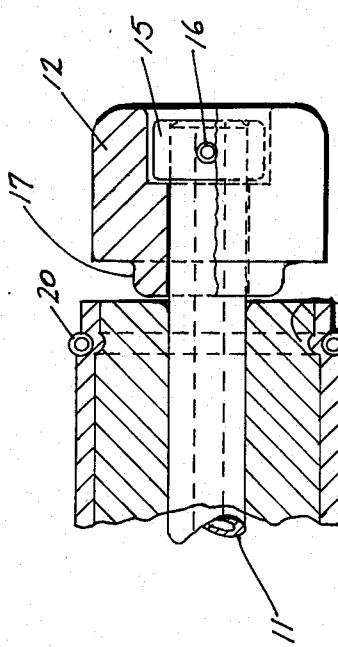

COLLAPSIBLE BACK-UP TOOL

BACKGROUND OF THE INVENTION

The present invention relates to an improved tool for backing a joint between adjacent abutting ends of a pair of tubular members while such ends are being joined together by a joining process such as welding, brazing, soldering, and the like, for holding the tubular elements in alignment while they are being joined together, and for preventing softened portions of the tubular elements from being displaced inwardly relative to the inner surfaces of the tubular elements during the joining process.

A principal object of the invention is to provide a collapsible back-up tool for backing a joint between end abutted tubular members and for maintaining such members in properly aligned positions during the joining operation.

Another object of the invention is to provide a back-up tool that may be easily collapsed and readily withdrawn from a pair of associated and abutted tubular members after completion of the joining process.

Still another object of the invention is to provide a collapsible back-up tool of mechanically simple construction that is easy to use so as to provide a device that will be economically feasible, long lasting, and relatively trouble-free in operation.

SUMMARY

In accordance with the present invention, an improved tool embodying the present invention includes a plurality of interengaging arcuate segments, the ends of which are supported on shoulder portions of each of a pair of end plugs which are slidably mounted on a shaft. When so supported, the segments form, in expanded condition, a substantially cylindrical surface that is collapsible when the end plugs are moved outwardly apart along the shaft.

DESCRIPTION

The foregoing have other objects and advantages which will become apparent from the following description taken in connection with the accompanying drawings in which:

FIG. 1 is a side elevational view, partly broken away and shown in section, of a collapsible tool embodying the present invention in expanded condition thereof;

FIG. 2 is a cross-sectional view taken on line 2—2 of FIG. 1;

FIG. 3 is a side elevational view, partly broken away and shown in section, of an end portion of the tool of FIG. 1 in collapsed condition; and FIG. 4 is a cross-sectional view taken on line 4—4 of FIG. 3.

In the drawings, a tool embodying the present invention is indicated generally at 10. The tool includes a longitudinal or shaft number 11 on which are slidably mounted a pair of end plugs 12. In addition to the central bore 13 through which shaft 11 extends, each of the plugs includes a counter bore 14 within which is received one of a pair of abutments 15 each of which is connected to one of the opposite ends of the shaft by pins 16.

Each of the plugs is provided with a shoulder 17 on which are supported a plurality of interengaging arcuate segments 18, 19. The outer peripheral surfaces of these segments form a substantially cylindrical surface, as is best shown in FIG. 2. A pair of endless or garter springs 20 are received in grooves 21 in the outer surfaces of the segments adjacent their ends, and the springs continuously urge the several segments in a radially inward direction. For reasons that will become apparent as the description proceeds, one pair of opposite segments 19 is loosely connected to a pin 22 which in turn is fixed to shaft 11.

When the end plugs are caused to move apart from one another along the shaft, the bottom face 23 of the counter bore ultimately engages abutment 15 and prevents further outward movement of the plugs, as is best shown in FIG. 3. During such movement of the plugs, longitudinal movement of segments 18, 19 relative to the shaft is restrained by pin 22 and springs 20. When the shoulder portion 17 of the plugs moves beyond the ends of segments 18, 19, the segments are urged radially inward under the influence of springs 20 to the collapsed condition.

In accordance with the present invention, the end plugs are constructed of a magnetic material such as iron or steel, and all other elements of the tool are formed of relatively non-magnetic material such as aluminum and its alloys, stainless steel, and the like. The magnetic end plugs are caused to move outwardly under the influence of a magnetic field, thus eliminating the necessity for complicated linkage or other mechanical structure to collapse the tool.

In operation, the tool is placed in its expanded condition manually by spreading segments 18, 19 apart and outwardly against the biasing influence of springs 20. The end plugs are then moved inwardly so that shoulder portions 17 will support the ends of the segments, as shown in FIG. 1. The tool is then inserted, in its expanded condition, within end abutted adjacent ends of a pair of tubular members. The substantially cylindrical surface of the tool is closely fitted to correspond with the internal diameter of the tubular members. When so inserted within said end abutted adjacent ends, the tool insures that the tubular members are properly centered and aligned relative to one another prior to and during the joining process. Additionally, the tool provides back-up and prevents undue distortion of the interior surfaces of the tubular members during the joining process.

After completion of the joining process, the tool is collapsed, thereby effecting a reduction in its external diameter, to facilitate its removal from the then joined together tubular members. The present invention avoids the necessity for physical contact to be made with either the tool or the joined tubular members. Collapse of the tool is achieved merely by subjecting its magnetic end plugs 12 to a magnetic field which causes them to move apart from one another along the shaft 11 and thereby remove the support from the segmented cylinder. Additionally, the magnetic structure of the tool enables it to be moved longitudinally within a tubular member and/or to be restrained at any desired location along the length of such member under the influence of a magnetic field.

Segments 18, 19 are made of a material having an electrically non-conductive surface such as anodized aluminum to prevent their being damaged from arc impingement on their outer surfaces when the tool is providing back-up of tubular members being joined by a welding process.

In most welding operations, depth of penetration is a significant factor since it affects the quality of the weld. In addition to providing the restraining and collapsing force for segments 18, 19, springs 20 also function to center the back-up tool concentrically within the tubular elements to be joined. As is best shown in FIG. 1, the springs project outwardly beyond the outer surface of the segments by an amount that may vary according to diameter of the springs 20 and the depth of grooves 21. By varying the depth of the grooves and the diameter of the springs, the extent of such outward projection can be preselected to provide control for the depth of penetration of the weld.

While the particular embodiment of the invention has been illustrated and described, it will be obvious that various changes and modifications can be made without departing from the invention and it is intended in the appended frames to cover all such changes and modifications that fall within the true spirit and scope of the invention.

What is claimed is:

1. A collapsible alignment and back-up tool for adjacent ends of tubular members to be butt-joined together comprising an assemblage expandable into and collapsible from a condition defining an elongate and substantially cylindrical member and adapted to be positioned in expanded condition within end abutted adjacent ends of a pair of tubular members prior to joining said ends together with the outer generally cylindrical surface portions of the assemblage disposed in substantially surface-to-surface engaging relation with the inner surface portions of said adjacent ends of said tubular members, said tool being constructed of a shaft, a pair of end plugs slidably mounted on said shaft and each having a shoulder portion encompassing said shaft and extending toward the other plug, and a plurality of adjacent interengaging arcuate segments forming said substantially cylindrical surface in said expanded condition when opposed ends of said segments are supported by said shoulder portions, said shaft and said segments being formed of relatively non-magnetic material and each of said end plugs being formed of relatively magnetic material to cause said plugs to move relative to said shaft in opposite directions and collapse said surface when the tool is subjected to the influence of a magnetic field.

2. A tool according to claim 1 and additionally including resilient means interconnected with said segments and continuously urging said segments in a radially inward direction relative to the axis of said shaft.

3. A tool according to claim 1 and additionally including a member interconnecting said segments and said shaft to restrain longitudinal movement of said segments in a direction parallel to the axis of said shaft and permitting radial movement of said segments.

4. A tool according to claim 1 and additionally including stop members each connected to said shaft at opposite ends thereof and engageable with one of said plugs to limit movement thereof.

5. A tool according to claim 1 wherein said segments consist of a plurality of outer segments guided by an equal number of guiding segments interposed between said shaft and said outer segments.

6. A tool according to claim 1 wherein said segments are formed of anodized aluminum.

7. A tool according to claim 1 wherein said segments have grooved portions forming a substantially continuous circumferentially-extending groove in said cylindrical surface, and additionally including continuous spring means disposed in said groove and urging said segments radially inward and projecting outwardly from said cylindrical surface a preselected amount to center said tool within said tubular members and to control weld penetration thereof.

* * * * *